Nov. 6, 1956  M. S. RAPAPORT  2,769,380

CAMERA SHUTTER AND FILM RELEASE

Filed Dec. 21, 1955

INVENTOR.
MYRON RAPAPORT
BY
ATTORNEY.

United States Patent Office 2,769,380
Patented Nov. 6, 1956

2,769,380

CAMERA SHUTTER AND FILM RELEASE

Myron S. Rapaport, New Rochelle, N. Y.

Application December 21, 1955, Serial No. 554,432

8 Claims. (Cl. 95—31)

The present invention is directed to cameras and more particularly to an attachment which is removable and which is capable of serving as a means for automatically advancing the film in the camera, together with or after the release of the shutter.

It has been recognized for a considerable number of years that it is desirable to provide a camera with means for automatically shifting the film one frame immediately upon the exposure of the frame. Such a mechanism would avoid the accidental re-exposure of an already exposed film, which would destroy one of the frames of the film and two of the pictures. Accordingly the prior art provided a number of devices which were built into the camera to accomplish the result. These devices were placed either in one side of the camera casing or at one end thereof. They considerably increased the bulk of the camera, making it more difficult to handle. In addition, such devices were generally quite complicated and consisted of a large number of parts, such as springs, levers, clutches, trains of gears and the like. This increased the cost of the camera to a very substantial extent and because of the presence of a large number of operating elements, the device was likely to get out of order. Also at times, it is desirable to operate the camera by hand and generally such prior devices could not be rendered inoperative for this purpose.

The present invention is intended and adapted to overcome the difficulties and disadvantages inherent in prior devices of the type described, it being among the objects of the present invention to provide an operating attachment for a camera which is an independent unit and may be fitted onto the casing of the camera and removable at will.

It is also among the objects of the present invention to provide a device which is simple in construction and compact, and which is sturdy and not subject to accidental damage.

It is further among the objects of the present invention to provide an attachment for cameras which is adapted to fit various constructions of cameras to accomplish the desired result.

In practicing the present invention, there is provided a plate which constitutes the base for the attachment. Means are provided at one end so that the plate may be fitted onto an element normally appearing on most cameras. Mounted on the plate is a coil spring with a means for attaching the same onto the operating knob of the camera, which is used for advancing the film after each exposure. Means for winding the spring and maintaining it in wound condition are also mounted on the plate. A plunger mounted for axial movement with the plate has its end substantially in contact with the pin or button of the camera, which when depressed releases the shutter to expose the film. In the operation of the device, it is placed on the camera in the operative position and the plunger is pressed, whereby the shutter of the camera is momentarily released, exposing the film and immediately thereupon, the spring is rendered operative to rotate the knob of the camera and advance the film one frame. The device is now in operative position for the next exposure.

In the accompanying drawing constituting a part hereof and in which like reference characters indicate like parts, Fig. 1 is a fragmentary front elevational view of a camera having the attachment of the present invention mounted thereon, some parts being broken away for clearness;

Figure 1:
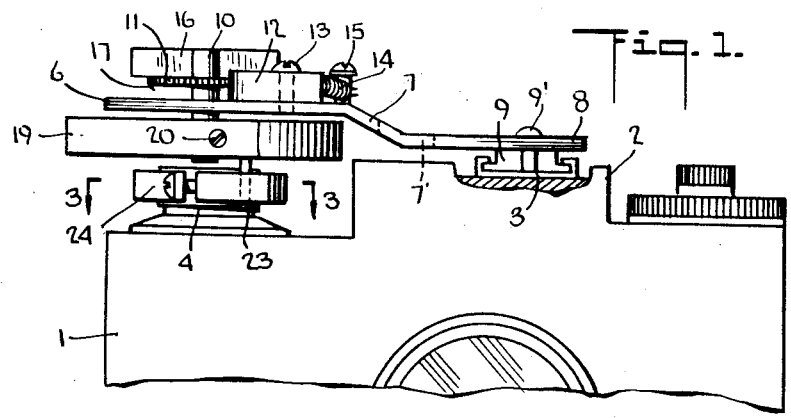
Figure 2:
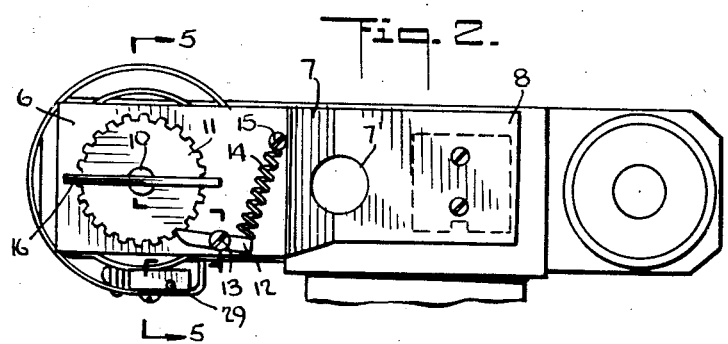
Fig. 2 is a side elevational view of the camera, with the attachment as shown in Fig. 1.
Figures 3, 5:
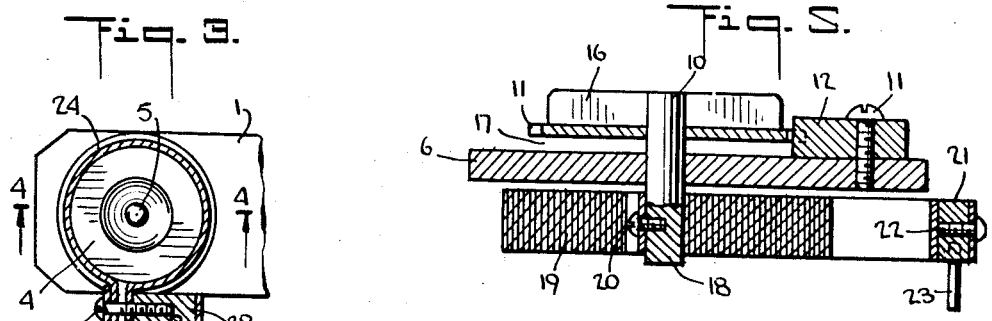
Fig. 3 is a transverse cross-sectional view taken along line 3—3 of Fig. 1.
Fig. 5 is a vertical cross-sectional view taken along line 5—5 of Fig. 2.

A standard camera 1 having a built-in exposure meter 2 on one side thereof has a guide or accessory clip 3 secured on exposure meter 2. A knob 4 at one end of the camera is connected to mechanism within the camera for advancing the film. Pin 5 located centrally of knob 4 extends into the camera and operates the shutter.

The attachment includes a flat plate 6 having an intermediate offset portion 7 and an end 8 substantially parallel to end 6. A slide 9 is attached by rivet or machine screw 9' at the underside of end 8 and is adapted to be held in track 3 in operative position. Plunger 10 is mounted in end 6 of the plate for limited sliding and rotating movement in a suitable opening therein. An opening 7' in the plate permits reading of the dial of timer 2.

A gear or sprocket 11 is fixed to plunger 10 and a dog or pawl 12 secured to end 6 by machine screw 13 or equivalent element meshes with gear 11. A spring 14 attached to dog 12 at one end has its other end held on machine screw, rivet, steel pin or the like 15 anchored in the plate. Handle 16 fixed on the top of plunger 10 serves as a means for rotating the plunger and winding of the spring. Space 17 indicates the amount of longitudinal movement of plunger 10.

Around the lower end 18 of plunger 10, there is placed a flat coil spring 19, the inner end of which is secured to said plunger by screw 20. The outer end of the spring is secured to a block 21 by machine screw 22. A depending pin 23 is fixed in block 21. Split ring 24 is adapted to surround knob 4 and to be clamped thereon. Extending ends 26 of ring 24 are tightened around knob 4 by screw 27 threaded into block 28. An opening 29 in said block is adapted to accommodate pin 23.

In the operation of the device, ring 24 is clamped in position on knob 4 and slide 9 is inserted in track 3, which automatically positions plunger 10 in longitudinal alinement with pin 5 and practically in contact therewith. Pin 23 is then inserted in opening 29. Handle 16 is rotated to wind spring 19 to full tension, dog 3 maintaining the tension on the spring. At this stage, knob 4 cannot move, being held in fixed position by the usual mechanism within the camera. The camera is adjusted for taking a picture and plunger 10 pressed, causing the assembly of the plunger, handle 16 and gear 11 to move longitudinally whereby pin 5 is depressed. This releases the shutter and the frame of the film is exposed. Practically simultaneously therewith, knob 4 is released and the tension of spring 19 causes rotation thereof and movement of the film for one frame, whereupon knob 4 is again in fixed position. The pressure of a spring within the camera causes pin 5 to move out into its original position, simultaneously causing plunger 10 to move into position for operation.

Figures 4, 6:
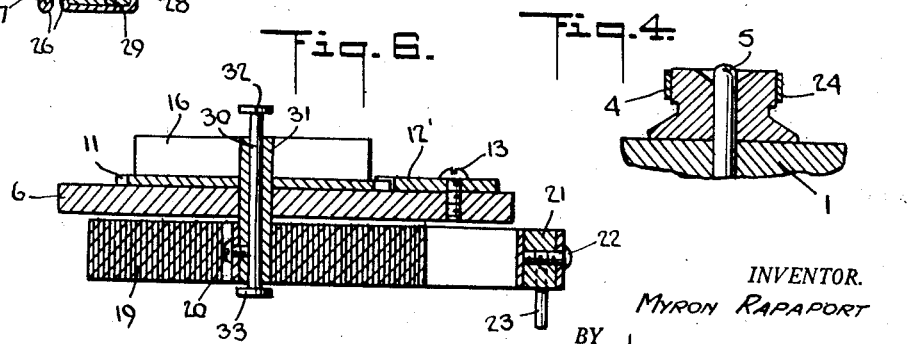
Fig. 4 is a vertical cross-sectional view taken along line 4—4 of Fig. 3.
Fig. 6 is a view similar to Fig. 5, showing a modified form of the invention.

In the embodiment of Fig. 6, there is shown a modified form of the invention which eliminates the necessity for movement of handle 16 and gear 11 and eliminates the necessity for space 17. The elements of this modification are generally the same as those shown in Figs. 1 to 5, with the difference that plunger 10 is of a different construction. It is in the form of a pin 30 having flattened ends 32 and 33 which limit the longitudinal movement thereof. Plunger 30 moves freely within sleeve 31, which is fixed in end 6 of the plate. Handle 16 and gear 11 are fixed to the upper end of sleeve 31 and spring 19 is fixed to the lower end thereof. The operation of this form of the invention is identical with that described above.

Although the invention has been described setting forth two specific embodiments thereof, the invention is not to be limited to the details of construction described and shown herein. Various changes in details may be made as will be apparent to those skilled in the art. For instance, the plate need not have an offset portion, may be of any suitable shape, and may be in other than plate form. The shutter release mechanism of the attachment may be offset with the plunger on one side. The arrangement of the elements may be varied, depending upon the construction of the camera to which it is to be fitted. There may be substituted for certain of the elements described herein, well-known equivalent mechanical elements for performing the same functions.

Gear 11, dog 12, spring 14 and associated parts may be on the underside of plate 6. The lightmeter is often not a part of the camera and the present device may be mounted directly on the side of the camera on the usual accessory clip. Also, an accessory clip may be mounted on top of the plate for holding such accessories as a view finder. Instead of screw 9' other means for fixing slide 9 onto the plate may be substituted, such as rivets, pins, flat head screws, adhesives and the like. The body of the plate may be of transparent plastic material in whole or in part to allow reading of the meter and to enhance the appearance of the unit. In place of clamping means 27—28 for ring 24 various latches such as the saddle type of clamp may be used.

These and other changes may be made within the spirit of the invention, which is to be broadly construed and not to be limited except by the character of the claims appended hereto.

I claim:

1. A removable attachment for cameras comprising a plate, means at one end of said plate for attaching the same to a side of said camera, said side having thereon a rotatable member for advancing film in said camera and a central pin for releasing a shutter when said pin is depressed, a band for embracing said rotatable member, a coil spring having the outer end thereof attached to said band, the inner end of said spring being attached to a central stop, a ratchet fixed to said stop and a pawl on said plate cooperating with said ratchet, a central plunger mounted on said plate in longitudinal alinement with said pin and adapted to be moved transversely of said plate to depress said pin.

2. A removable attachment for cameras comprising a plate, means at one end of said plate for attaching the same to a side of said camera, said side having thereon a rotatable member for advancing film in said camera and a central pin for releasing a shutter when said pin is depressed, a band for embracing said rotatable member, a coil spring having the outer end thereof attached to said band, the inner end of said spring being attached to a central stop, a ratchet fixed to said stop and a pawl on said plate cooperating with said ratchet, a central plunger mounted on said plate in longitudinal alinement with said pin and adapted to be moved transversely of said plate to depress said pin, at least a portion of said plate between the plunger and attaching means being transparent so that the dial on the meter may be read.

3. A removable attachment for cameras comprising a plate, means at one end of said plate for attaching the same to a side of said camera, said side having thereon a rotatable member for advancing film in said camera and a central pin for releasing a shutter when said pin is depressed, a band for embracing said rotatable member, a coil spring having the outer end thereof attached to said band, the inner end of said spring being attached to a central stop, a ratchet fixed to said stop and a pawl on said plate cooperating with said ratchet, a central plunger mounted on said plate in longitudinal alinement with said pin and adapted to be moved transversely of said plate to depress said pin, an intermediate portion of said plate being offset.

4. A removable attachment for cameras comprising a plate, means at one end of said plate for attaching the same to a side of said camera, said side having thereon a rotatable member for advancing film in said camera and a central pin for releasing a shutter when said pin is depressed, a band for embracing said rotatable member, a coil spring having the outer end thereof attached to said band, the inner end of said spring being attached to a central stop, a ratchet fixed to said stop and a pawl on said plate cooperating with said ratchet, a central plunger mounted on said plate in longitudinal alinement with said pin and adapted to be moved transversely of said plate to depress said pin, an opening in an intermediate portion of said plate.

5. A removable attachment for cameras comprising a plate, means at one end of said plate for attaching the same to a side of said camera, said side having thereon a rotatable member for advancing film in said camera and a central pin for releasing a shutter when said pin is depressed, a band for embracing said rotatable member, a coil spring having the outer end thereof attached to said band, the inner end of said spring being attached to a central stop, a ratchet fixed to said stop and a pawl on said plate cooperating with said ratchet, a central plunger mounted on said plate in longitudinal alinement with said pin and adapted to be moved transversely of said plate to depress said pin, said spring being on the side of said plate adjacent to said camera.

6. A removable attachment for cameras comprising a plate, means at one end of said plate for attaching the same to a side of said camera, said side having thereon o rotatable member for advancing film in said camera and a central pin for releasing a shutter when said pin is depressed, a band for embracing said rotatable member, a coil spring having the outer end thereof attached to said band, the inner end of said spring being attached to a central stop, a ratchet fixed to said stop and a pawl on said plate cooperating with said ratchet, a central plunger mounted on said plate in longitudinal alinement with said pin and adapted to be moved transversely of said plate to depress said pin, said plunger being slidably mounted on said stop.

7. A removable attachment for cameras comprising a plate, means at one end of said plate for attaching the same to a side of said camera, said side having thereon a rotatable member for advancing film in said camera and a central pin for releasing a shutter when said pin is depressed, a band for embracing said rotatable member, a coil spring having the outer end thereof attached to said band, the inner end of said spring being attached to a central stop, a ratchet fixed to said stop and a pawl on said plate cooperating with said ratchet, a central plunger mounted on said plate in longitudinal alinement with said pin and adapted to be moved transversely of said plate to depress said pin, said spring being on the side of said plate adjacent to said camera and said ratchet being on the opposite side of said plate.

8. A removable attachment for cameras comprising a plate, means at one end of said plate for attaching the same to a side of said camera, said side having thereon a rotatable member for advancing film in said camera and a central pin for releasing a shutter when said pin is depressed, a band for embracing said rotatable member, a coil spring having the outer end thereof attached to said band, the inner end of said spring being attached to a central stop, a ratchet fixed to said stop and a pawl on said plate cooperating with said ratchet, a central plunger mounted on said plate in longitudinal alinement with said pin and adapted to be moved transversely of said plate to depress said pin, and means on said ratchet for rotating the same to place said spring under tension.

No references cited.